United States Patent [19]
Hamprecht et al.

[11] 3,896,155
[45] July 22, 1975

[54] OXIME ETHERS
[75] Inventors: Gerhard Hamprecht, Mannheim;
Karl-Heinz Koenig, Frankenthal;
Adolf Fischer, Mutterstadt, all of Germany
[73] Assignee: Badische Anilin- & Soda-Fabrik Aktiengesellschaft, Ludwigshafen (Rhine), Germany
[22] Filed: Apr. 11, 1973
[21] Appl. No.: 349,914

[30] Foreign Application Priority Data
Apr. 22, 1972 Germany............................ 2219802

[52] U.S. Cl.................... 260/465 E; 71/98; 71/103; 71/105; 260/456 A; 260/456 R; 260/463; 260/465 D
[51] Int. Cl. ........................................ C07c 121/78

[58] Field of Search............ 260/465 D, 465 E, 463, 260/456 R, 456 A

[56] References Cited
UNITED STATES PATENTS
3,733,359    5/1973    Hubele........................... 260/465 X Primary Examiner—Lewis Gotts
Assistant Examiner—Dolph H. Torrence
Attorney, Agent, or Firm—Johnston, Keil, Thompson & Shurtleff

[57]    ABSTRACT

New and valuable substituted oxime ethers having herbicidal properties; herbicides containing these compounds as active ingredients; a process for controlling the growth of unwanted plants with these compounds; and a process for preparing these compounds.

7 Claims, No Drawings

OXIME ETHERS

The present invention relates to new and valuable substituted oxime ethers having herbicidal properties; herbicides containing these compounds as active ingredients; a proces for controlling the growth of unwanted plants with these compounds; and a process for preparing these compounds.

It is known that 3,5-dibromo-4-hydroxybenzaldehyde oxime-O-(2,4-dinitrophenyl)-ether has herbicidal properties (German laid-open applications DOS Nos. 1,568,231 and 1,816,825). However, its action is poor.

We have now found that oxime ethers of the formula

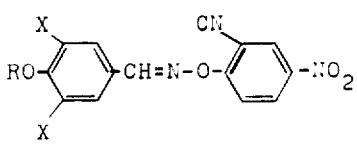

I, where X denotes halogen (bromo, iodo) and R denotes hydrogen, an alkali metal (Li, Na, K), an acyl radical or a. alkyl, haloalkyl, alkoxyalkyl, especially alkoxymethylene, alkoxyethylene or alkoxypropylene, or alkylthioalkyl, or
b. aroyl substituted by halogen, $NO_2$, $CF_3$, CN or lower alkyl, alkoxy or alkylthio, or
c. carbo-(alkoxy)-alkoxy, carbo-(alkylthio)-alkoxy or carbophenoxy which may be substituted by halogen, $NO_2$, $CF_3$, CN or lower alkyl, alkoxy or alkylthio, or
d. alkylcarbamoyl, cycloalkylcarbamoyl, haloalkylcarbamoyl, alkoxyalkylcarbamoyl, alkylthioalkylcarbamoyl, phenylcarbamoyl which may be substituted by halogen, $NO_2$, $CF_3$, CN, lower alkyl, alkoxy or alkylthio, mixed alkylcarbamoyl, optionally substituted phenylcarbamoyl or alkylsulfonyl, or
e. arylsulfonyl which may be substituted by halogen, $NO_2$, $CF_3$, CN, lower alkyl or alkoxy, or
f. monoalkylsulfamoyl, dialkylsulfamoyl, mixed alkylsulfamoyl or arylsulfamoyl which may be substituted by halogen, $NO_2$, $CF_3$, CN or lower alkyl, have a better herbicidal action than the prior art compound.

The new compounds are used as herbicides in amounts of from 0.5 to 5 kg/hectare. They are applied postemergence to the green parts of the plant (leaves, stem). Their action is particularly good on dicotyledonous weeds and they are suitable for controlling weeds in crops such as cereals, Indian corn and sorghum.

Compounds of the formula II

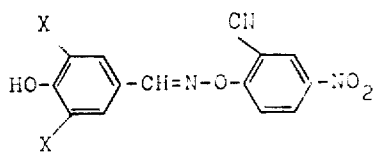

II, where X has the above meanings, may be prepared from the salts of 3,5-dihalo-4-hydroxybenzaldehyde oxime and 2-chloro-5-nitrobenzonitrile. The corresponding oxime ethers may also be obtained without isolating the oxime salts by direct condensation of 3,5-dihalo-4-hydroxybenzaldehyde oxime with 2-chloro-5-nitrobenzonitrile, for instance in alcoholic solution with the addition of sodium ethylate (Houben-Weyl, Methoden der organischen Chemie, 4th edition, vol. 10/4, p. 221).

It is, however, particularly advantageous to carry out the reaction using an excess of alkali metal alcoholate. Although it is not apparent from the equation of the reaction, the end product is obtained, for instance in the condensation of 3,5-diido-4-hydroxybenzaldehyde oxime with 2-chloro-5-nitrobenzonitrile in the presence of twice (at least 1.5 times) the stoichiometric amount of sodium ethylate, in the form of its sodium salt in much higher yields compared with the yields obtained using only stoichiometric amounts of sodium ethylate. The time required for stirring is simultaneously decreased by more than 25%. In view of the state of the art, these advantageous results are surprising.

In general, the reaction is carried out at a temperature of from 10° to 100°C, especially from 30° to 70°C; at atmospheric or superatmospheric pressure; and continuously or batchwise. The reaction may be carried out in a solvent, e.g., dimethylformamide, dimethyl sulfoxide, ethanol, acetonitrile, dioxane, tetrahydrofuran and benzene. The reaction may be carried out as follows:

3,5-dibromo-or 3,5-diiodo-4-hydroxybenzaldehyde oxime is dissolved or suspended in twice the stoichiometric amount of sodium ehtylate in absolute ethanol and added, at from 30° to 50°C, to a solution of 2-chloro-5-nitrobenzonitrile in a small amount of benzene. During addition a red creamy precipitate forms. Stirring is carried out for 1 to 2 hours at 50° to 70°C and then the mixture is suction filtered and washed with water. The desired oxime ethers are obtained as pure sodium salts. It is, however, also possible to suspend the precipitate in the calculated amount of dilute acid in order to obtain, after suction filtration, 3,5-diido or 3,5-dibromo-4-hydroxybenzaldehyde oxime-(2-cyano-4-nitrophenyl)-ether. The oxime ethers are generally obtained as isomer mixtures.

Higher metal alcoholates may also be used instead of the abovementioned condensing agent; they should be employed in an amount at least 1.5 times and preferably twice that of the oxime used.

The salts which are obtained may be converted under particularly mild conditions with haloformiates of the formula

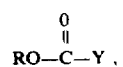

where R has the above meanings and Y denotes halogen (chloro), into the corresponding carbonates.

If it is desired to react compounds of the formula II to the corresponding ester, the salts may expediently be reacted with carbonyl chlorides under mild conditions.

It is also possible to prepare the corresponding phenyl esters by direct esterification at from 0° to 140°C with carboxylic acids or by reacting with ketene.

If compounds of the formula II are to be converted into the corresponding ethers, the phenolic OH group may — advantageously after salt formation — be etherified with alkyl or aryl halides. Reactive alkyl sulfates may also be used.

If compounds of the formula II are reacted with epoxides, e.g., ethylene oxide, β-hydroxyethylene ethers are obtained which may be alkylated.

If it is desired to convert compounds of the formula II into the corresponding carbamates, they may be converted with phosgene to chloroformyl phenolates, which are then reacted with an amine. They may also, however, be reacted direct with isocyanates; with compounds which release these isocyanates intermediately; or with carbamyl chlorides.

Similarly, sulfone or sulfamoyl esters are obtained by reaction of the phenolic OH group with a sulfochloride or sulfamoyl chloride, if necessary with the aid of a base.

The following table contains examples of new compounds of the formula I:

| R | X = Br m.p. | X = I m.p. |
|---|---|---|
| H— | 212–214°C (decomposes) | 205°C (decomposes) |
| Li— | | |
| Na— | 209–260°C (decomposes) | 213–245°C (decomposes) |
| K— | | |
| CH$_3$— | | |
| C$_2$H$_5$— | | |
| i–C$_3$H$_7$— | | |
| Cl–CH$_2$–CH$_2$— | | |
| CH$_3$O–CH$_2$— | | |
| CH$_3$O–C$_2$H$_4$— | | |
| CH$_3$O–CH$_2$–CH(CH$_3$) | | |
| CH$_3$–S–CH$_2$–CH$_2$— | | |
| CH$_3$–C(=O)— | 209°C (decomposes) | |
| C$_2$H$_5$–C(=O)— | 205°C (decomposes) | |
| Cl–CH$_2$–C(=O)— | | |
| (cyclohexyl)–C(=O)— | | |
| (phenyl)–C(=O)— | 206°C (decomposes) | |
| Cl–(phenyl)–C(=O)— | | |
| O$_2$N–(phenyl)–C(=O)— | | |
| CF$_3$–(phenyl)–C(=O)— | | |
| (m-tolyl)–C(=O)— | | |

-Continued

| R | X = Br m.p. | X = I m.p. |
|---|---|---|
| CH$_3$–(phenyl)–C(=O)— | | |
| CH$_3$O–(phenyl)–C(=O)— | | |
| CH$_3$–S–(phenyl)–C(=O)— | | |
| CH$_3$O–C(=O)— | | |
| C$_2$H$_5$O–C(=O)— | | |
| i–C$_3$H$_7$O–C(=O)— | | |
| CH$_3$(CH$_2$)$_3$O–C(=O)— | 149–152°C | |
| Cl–(CH$_2$)$_3$–O–C(=O)— | | |
| CH$_3$–O–CH$_2$–CH$_2$–O–C(=O)— | | |
| CH$_3$–S–CH$_2$–CH$_2$–O–C(=O)— | | |
| (phenyl)–O–C(=O)— | | |
| Cl–(phenyl,Cl)–O–C(=O)— | | |
| O$_2$N–(phenyl)–O–C(=O)— | | |
| (CF$_3$-phenyl)–O–C(=O)— | | |
| (CN-phenyl)–O–C(=O)— | | |
| Cl–(CH$_3$-phenyl)–O–C(=O)— | | |
| CH$_3$O–(phenyl)–O–C(=O)— | | |
| CH$_3$S–(phenyl)–O–C(=O)— | | |
| CH$_3$–NH–C(=O)— | 202°C (decomposes) | |
| C$_2$H$_5$–NH–C(=O)— | | |
| i–C$_3$H$_7$–NH–C(=O)— | 187°C (decomposes) | |
| Cl–(CH$_2$)$_2$–NH–C(=O)— | | |
| CH$_3$O–(CH$_2$)–NH–C(=O)— | | |

-Continued

| R | X = Br m.p. | X = I m.p. |
|---|---|---|
| CH₃—S—(CH₂)₃—NH—C(O)— | | |
| (cyclohexyl H)—NH—C(O)— | | |
| C₆H₅—NH—C(O)— | 198°C (decomposes) | |
| Cl—C₆H₄—NH—C(O)— | | |
| O₂N—C₆H₄—NH—C(O)— | | |
| (3-CF₃)C₆H₄—NH—C(O)— | | |
| (3-CN)C₆H₄—NH—C(O)— | | |
| CH₃—C₆H₄—NH—C(O)— | | |
| CH₃O—C₆H₄—NH—C(O)— | | |
| CH₃S—C₆H₄—NH—C(O)— | | |
| CH₃(C₆H₅)N—C(O)— | | |
| (CH₃)₂—N—C(O)— | | |
| CH₃—SO₂— | | |
| C₂H₅—SO₂— | 209°C (decomposes) | |
| i—C₃H₇—SO₂— | | |
| C₆H₅—SO₂— | 206°C (decomposes) | |
| CH₃—C₆H₄—SO₂— | | |
| CH₃O—C₆H₄—SO₂— | | |
| CH₃S—C₆H₄—SO₂— | | |
| Cl—C₆H₄—SO₂— | | |
| O₂N—C₆H₄—SO₂— | | |
| (naphthyl)—SO₂— | | |
| (3-CF₃)C₆H₄—SO₂— | | |
| (3-CN)C₆H₄—SO₂— | | |
| CH₃—NH—SO₂— | | |
| C₂H₅—NH—SO₂— | | |
| Cl—CH₂—CH₂—NH—SO₂— | | |
| (CH₃)₂—N—SO₂— | | |
| C₆H₅(CH₃)N—SO₂— | | |
| (Cl—C₆H₄)(CH₃)N—SO₂— | | |
| (O₂N—C₆H₄)(CH₃)N—SO₂— | | |

The agents may be used as solutions, emulsions, suspensions, oil dispersions, granules or dusts. The form of application depends entirely on the purpose for which the agents are being used; in any case it should ensure a fine distribution of the active ingredient.

For the preparation of solutions to be sprayed direct, mineral oil fractions of medium to high boiling point, such as kerosene or diesel oil, further coal-tar oils and oils of vegetable or mineral origin, and cyclic hydrocarbons such as tetra-hydronaphthalene and alkylated naphthalenes are suitable.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents. Concentrates which are suitable for dilution with water may be prepared from active ingredient, wetting agent, adherent, emulsifying or dispersing agent and possibly solvent. Oils of various types may be added to ready-to-use spray liquors.

Dusts may be prepared by mixing or grinding the active ingredients with a solid carrier, e.g., clay or fertilizers.

Granules may be prepared by bonding the active ingredients to solid carriers.

Directly sprayable dispersions may also be prepared with oils.

The new compounds may be mixed with fertilizers, insecticides, fungicides and other herbicides.

EXAMPLE 1

251 parts (by weight) of 3,5-dibromo-4-hydroxybenzaldehyde oxime in a solution of 39 parts of sodium (100% excess) in 1,300 parts of absolute ethanol is added, at 45°C over a period of 40 minutes and while stirring, to a solution of 156 parts of 2-chloro-5-nitrobenzonitrile in 370 parts of benzene. The mixture is stirred for 2 hours at 60°C. A precipitate forms which, after cooling, is washed with 1,500 parts of water. After drying there is obtained 337 parts (86% of theory) of the sodium salt of 3,5-dibromo-4-hydroxybenzaldehyde oxime-(2-cyano-4-nitrophenyl)-ether as a yellowish powder; m.p.: 209° – 260°C (decomposes).

EXAMPLE 2

By acidifying the sodium salt obtained in Example 1 by briefly stirring it in a mixture of 2,000 parts of water and 74 parts of concentrated hydrochloric acid, the free 3,5-dibromo-4-hydroxybenzaldehyde oxime-(2-cyano-4-nitrophenyl)-ether is obtained in quantitative yield after suction filtration, washing with water and drying; m.p.: 204°C (decomposes). A sample recrystallized from a mixture of dimethylformamide and ethanol decomposes at 212° to 214°C.

EXAMPLE 3

394 parts (by weight) of 3,5-diiodo-4-hydroxybenzaldehyde oxime suspended in a solution of 46.6 parts of sodium (100% excess) in 1,280 parts of absolute ethanol is added, at 48°C over a period of 45 minutes and while stirring, to a solution of 186.3 parts of 2-chloro-5-nitrobenzonitrile in 440 parts of benzene. The mixture is then stirred for 2 hours at 65°C. After cooling, the precipitate is suction filtered, washed with 1,600 parts of water and dried. There is obtained 490 parts (87% of theory) of the sodium salt of 3,5-diido-4-hydroxybenzaldehyde oxime-(2-cyano-4-nitrophenyl)-ether as a brownish powder; m.p.: 213° – 245°C (decomposes).

EXAMPLE 4

The sodium salt obtained in Example 3 is weakly acidified in a mixture of 2,500 parts of water and 88 parts of concentrated hydrochloric acid. After suction filtration, washing with water and drying there is obtained 471 parts (87% of theory, with reference to oxime used) of the free 3,5-diiodo-4-hydrobenzaldehyde oxime-(2-cyano-4-nitrophenyl)-ether; m.p.: 192°C (decomposes). A sample recrystallized from a mixture of dimethylformamide and ethanol decomposes from 205°C.

EXAMPLE 5

The plants wheat (*Triticum aestivum*), barley (*Hordeum vulgare*), rye (*Secale cereale*), chickweed (*Stellaria media*), catchweed bedstraw (*Galium aparine*), chamomile (*Matricaria chamomilla*), henbit (*Lamium amplexicaule*), common lambsquarters (*Chenopodium album*) and wild mustard (*Sinapis arvensis*) were treated at a growth height of 3 to 18 cm with 1 kg/ha of each of the following active ingredients, each being dispersed in 500 liters of water per hectare:

I  3,5-dibromo-4-hydroxybenzaldehyde oxime-O-(2-cyano-4-nitrophenyl)-ether
  II 3,5-dibromo-4-hydroxybenzaldoxime-O-(2,4-dinitrophenyl)-ether
  III sodium salt of 3,5-diiodo-4-hydroxybenzaldehyde oxime-O-(2-cyano-4-nitrophenyl)-ether
  IV sodium salt of 3,5-dibromo-4-hydroxybenzaldehyde oxime-O-(2-cyano-4-nitrophenyl)-ether.

After 1 to 2 weeks it was ascertained that active ingredients I, III and IV had a stronger herbicidal action on the unwanted plants than comparative agent II, combined with the same good crop plant compatibility.

The results of this experiment are given below:

| Active ingredient | I | II | III | IV |
|---|---|---|---|---|
| Crop plants |  |  |  |  |
| Triticum aestivum | 0 | 0 | 0 | 0 |
| Hordeum vulgare | 0 | 0 | 0 | 0 |
| Secale cereale | 0 | 0 | 0 | 0 |
| Unwanted plants |  |  |  |  |
| Stellaria media | 80 | 60 | 80 | 80 |
| Galium aparine | 95 | 70 | 80 | 95 |
| Matricaria | 100 | 90 | 95 | 100 |
| chamomilla |  |  |  |  |
| Lamium amplexicaule | 95 | 75 | 80 | 95 |
| Chenopodium album | 95 | 90 | 95 | 100 |
| Sinapis arvensis | 100 | 90 | 95 | 100 |

0 = no damage
100 = complete destruction

We claim:
1. A compound of the formula

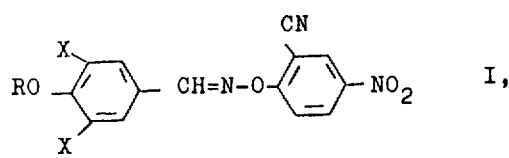

wherein:
X is selected from the group consisting of bromine and iodine; and
R is selected from the group consisting of hydrogen; lithium; sodium; potassium; alkyl of 1 to 3 carbon atoms or said alkyl substituted by chlorine, methoxy or thiomethoxy; alkanoyl of 2 to 3 carbon atoms; chloroacetyl;

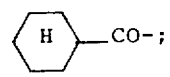

benzoyl or said benzoyl substituted by chloro, nitro, methyl, methoxy, thiomethoxy or trifluoromethyl; carboalkoxy of 1 to 4 carbon atoms in the alkoxy group or said carboalkoxy substituted by chlorine, methoxy or thiomethoxy; carbophenoxy or said carbophenoxy substituted by chlorine, nitro, cyano, methyl, methoxy, thiomethoxy or trifluoromethyl; alkylcarbamoyl of 1 to 3 carbon atoms in the alkyl group or said alkyl carbamoyl substituted on the alkyl chain by chlorine, methoxy or thiomethoxy; cyclohexylcarbamoyl; phenylcarbamoyl or said phenylcarbamoyl substituted on the phenyl ring by chlorine, nitro, cyano, methyl, methoxy, thiomethoxy or trifluoromethyl; N-methyl-N-phenylcarbamoyl; N,N-dimethylcarbamoyl; alkylsulfonyl of 1 to 3 carbon atoms; phenylsulfonyl or said phenylsulfonyl substituted on the phenyl ring by methyl, methoxy, thiomethoxy, chlorine, nitro, cyano or trifluoromethyl; monoalkylsulfamoyl of 1 to 3 carbon atoms; and dimethylsulfamoyl; phenylmethylsulfamoyl or said phenylmethylsulfamoyl substituted on the phenyl ring by chlorine, methyl, nitro, cyano or trifluoromethyl.

2. A compound as claimed in claim 1 wherein X is selected from the group consisting of bromine and iodine, and R is hydrogen.
3. A compound as claimed in claim 1 wherein X is selected from the group consisting of bromine and iodine, and R is lithium, sodium or potassium.
4. The compound
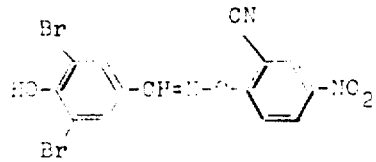
5. The compound
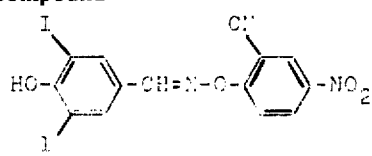
6. The compound
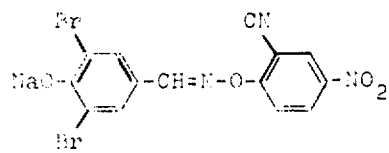
7. The compound
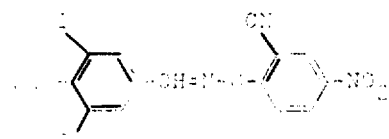
* * * * *

UNITED STATES PATENT OFFICE
CERTIFICATE OF CORRECTION

PATENT NO. : 3,896,155
DATED : July 22, 1975
INVENTOR(S) : Gerhard Hamprecht et al It is certified that error appears in the above-identified patent and that said Letters Patent are hereby corrected as shown below:

In Column 2, Line 36, delete "ehtylate" and substitute --ethylate--

In Column 6, Last structural formula, delete

" 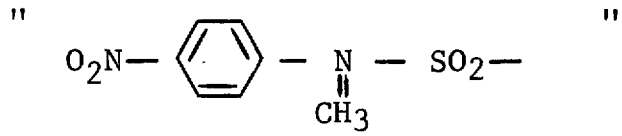 "

and substitute

-- 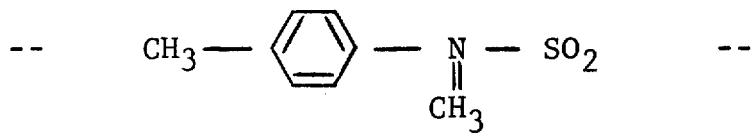 --

Signed and Sealed this

Third Day of August 1976

[SEAL]

Attest:

RUTH C. MASON
Attesting Officer

C. MARSHALL DANN
Commissioner of Patents and Trademarks